United States Patent Office 3,509,104
Patented Apr. 28, 1970

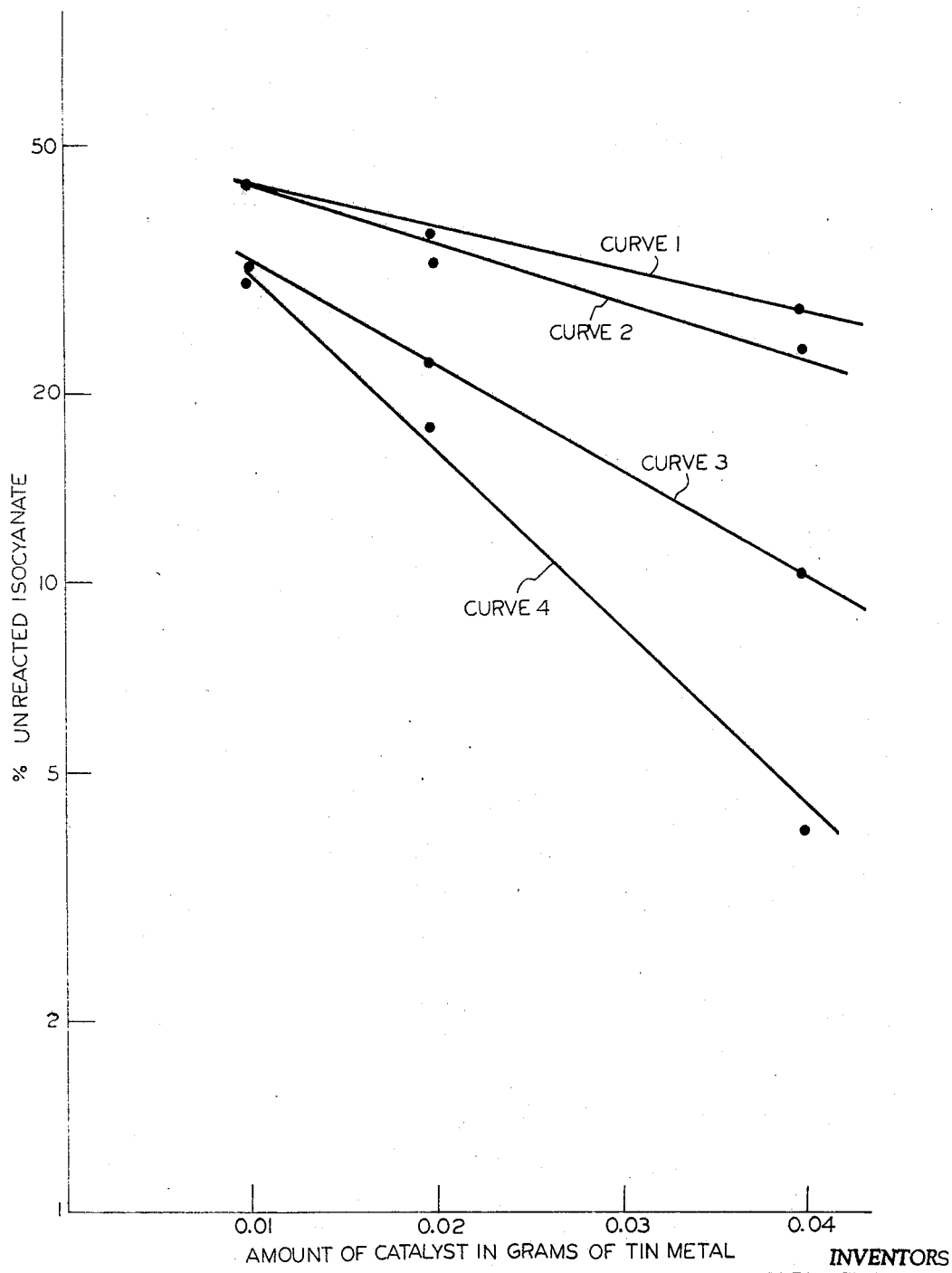

3,509,104
DIALKYLTIN SALT OF AROMATIC CARBOXYLIC ACIDS USEFUL AS CATALYSTS IN PRODUCING URETHANES AND POLYURETHANES
Charles H. Fuchsman, Cleveland Heights, and James C. Brown, Shaker Heights, Ohio, assignors to Ferro Corporation, Cleveland, Ohio, a corporation of Ohio
Filed Mar. 1, 1967, Ser. No. 619,793
Int. Cl. C08g 22/42
U.S. Cl. 260—77.5
5 Claims

ABSTRACT OF THE DISCLOSURE

Dialkyltin salts of aromatic carboxylic acids having a $pK_a$ in the range of about 2.0 to about 4.0 have been found to be useful as catalysts in producing urethanes and polyurethanes. When used as catalysts in the urethane reaction, these compounds greatly increase reaction speed in both the initial and later stages of the reaction when compared with the more conventional dialkyltin salts of other acids, e.g. dibutyltin dilaurate.

BACKGROUND OF THE INVENTION

This invention relates to polyurethane compositions and more particularly to a novel catalyst for the reaction of isocyanates with alcohols to form urethanes.

It is well known that in the presence of a suitable catalyst, certain isocyanate compounds can react with alcohols to form urethanes and can react with polyhydric alcohols, polyhydric ether alcohols and/or ester alcohols to form polyurethanes. By proper selection of the alcohols, the isocyanates, and the catalysts, as well as other ingredients, it is possible to produce compositions suitable for a wide variety of uses including coating compositions, sheeting, etc. Although, "polyurethane" foams are also known to be produced by somewhat similar reactions, the foaming is commonly produced by the reaction of water with an isocyanate group, and such reactions are not within the scope of the present invention. It is known that simple stannous salts of aliphatic carboxylic acids are more effective than other dibutyltin salts in the foam systems, but are less effective in the unfoamed systems. The novel catalysts of the present invention are intended for use in unfoamed systems.

A wide variety of catalysts have been proposed for use in producing polyurethanes, each catalyst having special advantages in particular types of applications. Until now, however, the most commonly accepted standard as a catalyst, particularly in non-foamed polyurethane compositions, has been dibutyltin dilaurate. In spite of its wide acceptance, dibutyltin dilaurate is objectionably slow for many common commercial uses and attempts have long been underway to find a new catalyst which was more efficient at equivalent concentrations, or at even higher concentrations, in order to obtain an overall increase in speed in the curing rate of the polymer.

The necessity for increased speed of polymer cure is common to a great number of polyurethane applications. This need for increased speed of polymer curing is particularly evident in the coating field, where large areas of a fast moving substrate such as cloth, plastic and/or paper are coated with a polyurethane composition. The time required to cure the polyurethane composition is frequently the limiting factor in production volume, since coating operations are usually carried on by coating the polyurethane composition on to a substrate which is then passed through a curing oven, or along a curing table under a bank of heat lamps, of a sufficient length to insure adequate, "tack free" cure of the polymer, whereupon it is continuously wound on a drum or reel.

In order to obtain optimum efficiency from the coating equipment which is usually quite expensive and which normally has the capacity to coat a very large area of substrate per unit time, it is usually desirable to pass the substrate through the coating equipment at the fastest possible speed. Therefore, for a given catalyst system each increase in the speed at which the substrate is passed through the coating apparatus requires a corresponding elongation of the heating and curing portion of the apparatus. This is sometimes accomplished in the passage of the coated substrate over an intricate series of rollers, in order to assure a sufficient time for a "tack free" cure of the polymer before winding onto a reel. Thus, a catalyst which could increase the speed of polymerization of the polyurethane coating composition would correspondingly reduce the amount of space required for post-coating conveying and heating and/or alternatively allow for a correspondingly significant increase in the volume of production.

In the past, in order to overcome the difficulties noted above, those skilled in the art have attempted many proposed mechanical and/or chemical solutions to the problems, including the substitution or blending of different catalysts, and also a substantial increase of the catalyst concentration in an effort to speed up the reaction. In general, the results of increased concentration of catalysts have yielded ever smaller increments in reaction speed for increasing increments of catalyst concentration, so that further increase in catalyst concentration no longer represents a suitable approach to improved plant production. Similarly, catalyst blends have in general failed to yield the desired cure rates.

SUMMARY OF INVENTION

We have now discovered that certain substituted aromatic carboxylic acids particularly salicylic acid, chlorobenzoic acid, nitrobenzoic acid, when combined with dialkyltin oxides or other suitable raw materials to form dialkyltin salts of the acids, provide a superior catalyst for the reaction of isocyanates with alcohols to form urethanes and more particularly the reaction of diisocyanates with polyhydric alcohols, ether-alcohols and/or ester-alcohols to form polyurethanes. In addition, we have found, surprisingly, that when the concentration of these dialkyltin salts is increased, in the range of concentrations where commercial catalysts cease to exhibit a concentration effect, an unexpectedly large increase in catalytic effect is observed.

The novel catalysts of the present invention correspond generally to the formula:

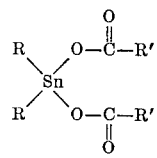

in which each R is a member selected from the group consisting of alkyl radicals having 2 to 8 carbon atoms, each $R^1$ is a member selected from the group consisting of aromatic radicals and substituted aromatic radicals having 6 to 15 carbon atoms and preferably wherein the acid $R^1$—COOH has a $pK_a$ of from about 2.0 to about 4.0, $pK_a$ being defined as the negative of the logarithm of the dissociation constant of the acid, as conventionally measured. The $pK_a$ of most acids having even slight water solubility, are readily available in the literature and in most comprehensive chemical handbooks.

Among the preferred aromatic carboxylic acids which have a $pK_a$ in the range set forth above, mention may be made, by way of illustration and not by way of limitation of the following acids:

| Acid: | pK$_a$ |
|---|---|
| Salicylic (o-hydroxybenzoic) | 2.97 |
| p-nitrobenzoic | 3.41 |
| o-nitrobenzoic | 2.16 |
| m-nitrobenzoic | 3.47 |
| p-chlorobenzoic | 3.98 |
| o-chlorobenzoic | 2.92 |
| m-chlorobenzoic | 3.82 |

Thus p-hydroxybenzoic acid (pK$_a$ 4.48) and p-aminobenzoic acid (pK$_a$ 4.92) having a pK$_a$ in excess of 4.0, are outside the limits for the preferred acids noted above. In spite of their similarity to one or more of the suitable acids listed above, they will form dialkyltin salts which are not as effective in catalyzing the urethane reaction, as the dialkyltin salts of the aromatic carboxylic acids which have a pK$_a$ in the range defined hereinbefore.

In other words the acids whose dialkyltin salts are the preferred catalysts of the present invention are distinguished principally by their acidity, as reflected in their pK$_a$, rather than by the nature of the substituted groups on the aromatic ring. While p-hydroxybenzoic acid and salicylic acid (o-hydroxybenzoic acid) both have a single hydroxyl group on a carboxy-substituted benzene ring, the p-hydroxybenzoic acid has a much higher pK$_a$ (4.48) than salicylic acid (2.97), and as will be seen in comparative test data hereinafter, the salicylic acid yields a dialkyltin salt which is far more effective as a catalyst in the polyurethane reaction than the corresponding dialkyltin salt of p-hydroxybenzoic acid.

In the case of the nitro-substituted and chloro-substituted benzoic acids, all of the position isomers are strong acids and consequently any of these acids may be used to form dialkyltin salts useful according to the present invention.

It is, of course, difficult to find aromatic carboxylic acids with very low pK$_a$ values, but examples can be readily found in the non-aromatic series (e.g., trichloracetic acid), which are very strongly acidic and where salts are almost useless as catalysts for the systems herein described.

DRAWINGS

FIGURE 1 shows the percentage of unreacted isocyanate after a reaction time of two minutes under controlled experimental conditions, as a function of catalyst concentration. These reaction curves will be discussed in more detail in the description of the preferred embodiments as set forth hereinafter.

SPECIFIC EMBODIMENTS

The following specific compounds are given by way of illustration and not by way of limitation, as examples of specific materials within the general formula above, and are not to be considered as in any way excluding any of the many other unlisted materials encompassed by the general formula; these compounds include:

(I)
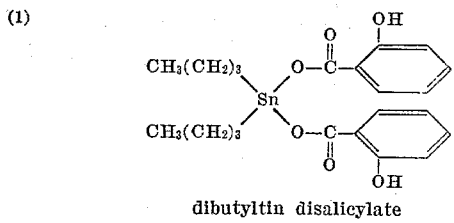
dibutyltin disalicylate (II)
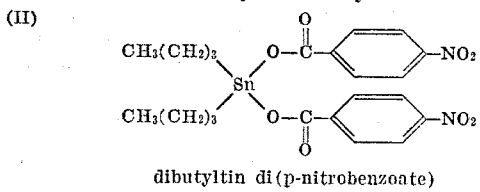
dibutyltin di(p-nitrobenzoate)

(III)
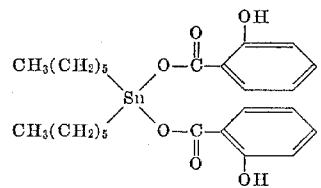
dihexyltin disalicylate (IV)
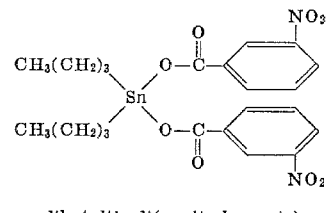
dibutyltin di(m-nitrobenzoate)

(V)
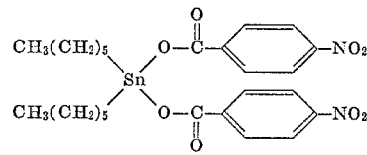
dihexyltin di(p-nitrobenzoate)

(VI)
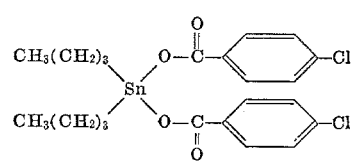
dibutyltin di(p-chlorobenzoate)

(VII)
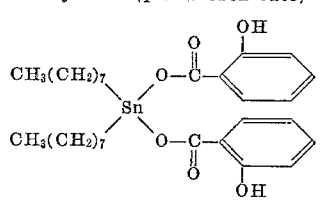
dioctyltin disalicylate (VIII)
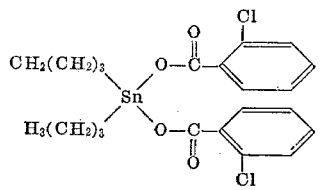
dibutyltin di(o-chlorobenzoate)

(IX)
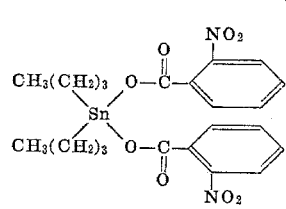
dibutyltin di(o-nitrobenzoate)

(X)
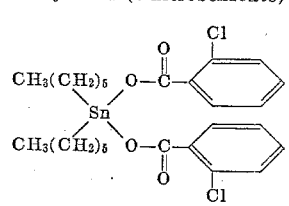
dihexyltin di(o-chlorobenzoate)

(XI)
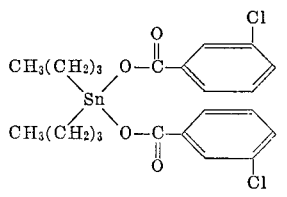
dibutyltin di(m-chlorobenzoate)

(XII)
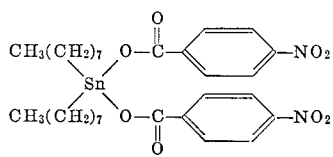
dioctyltin di(p-nitrobenzoate)

As previously noted the preferred catalysts of the present invention are salts of (a) an aromatic carboxylic acid having a $pK_a$ of from about 2.0 to about 4.0, and (b) a dialkyltin compound which will react with said acid to form the dialkyltin salt of said acid.

In general the novel catalysts of the present invention may be synthesized by a number of well known methods, one of which is the reaction of the dialkyltin oxide with the aromatic carboxylic acid according to the equation:

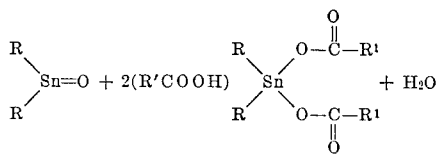

wherein R and R' are members as defined above.

The following detailed example will serve by way of illustration and not by way of limitation to show the manner in which we prepared two of the preferred catalysts of the present invention.

EXAMPLE I 100 grams (0.722 mole) of salicylic acid, 90.5 grams (0.364 mole) of dibutyltin oxide, and 100 mls. of benzene were placed in a one liter flask and heated under partial reflux until 7.0 mls. of water were evolved and collected in a Dean-Stark trap. The reaction mass was maintained at a temperature of 110° C. under vacuum, until all of the solvent had been removed. The remaining liquid was then filtered while hot, and allowed to solidify, yielding 183 grams (99.4% yield) of a white solid having a melting point of 69–72° C. The product was analyzed for tin content and found to contain 23.6% tin, as compared with a theoretical tin content of 23.4%.

EXAMPLE II

Dibutyltin di(p-nitrobenzoate) was prepared from 100 grams (0.6 mole) of p-nitrobenzoic acid and 75 grams (0.3 mole) of dibutyltin oxide. The p-nitrobenzoic acid was placed in a large flask with 400 grams of 1,3-diethoxyethane and heated with stirring to 140° C. After a clear solution had been obtained the dibutyltin oxide was added over a 4-minute period while maintaining a temperature of 130 to 140° C. When all of the dibutyltin oxide had been added the reaction mass was heated to 155° C. and maintained at that temperature until a clear solution was obtained. On cooling a 92% yield of dibutyltin di(p-nitrobenzoate) was precipitated out as yellow crystals which were found to have melting point of 214–218° C. and a tin content of 20.88% as compared with a theoretical tin content of 21%.

A series of tests were now conducted to evaluate the efficiency of the novel catalysts of the present invention. In these tests the efficiency of the catalysts of the present invention was determined by comparison with dibutyltin dilaurate, the accepted standard in commercial applications.

One means of measuring catalytic efficiency is to initiate the formation of urethanes, then allowing the reaction to proceed for a pre-determined period of time at the end of which the reaction is quenched by the addition of an amine in toluene solution. In this manner it is possible to measure the amount of unreacted isocyanate by titration of the unreacted amine with standard aqueous mineral acids.

It will, of course, be understood that the test procedure above, properly used, will yield an absolute measurement of the percentage of reaction, but such a technique is not always practical or feasible where polyurethanes are being formed because the possible formation of an immiscible or insoluble product greatly increases the difficulty of obtaining representative samples for the titration. Since it can be assumed as a first approximation that the reaction of the individual hydroxyl groups in a polyhydric alcohol will be independent of the degree of reaction of the other hydroxy groups in the same molecule (particularly if the hydroxyl groups are not on vicinal carbon atoms), the catalysts were evaluated first, using monohydric alcohols. It is, however, known that the reactivity of primary hydroxyl groups in the urethane reaction is greater than that of secondary hydroxyl groups. Since both primary and secondary hydroxyl groups are found in significant concentrations in the polyols used for polyurethane coatings, the catalyst evaluation included compounds typifying primary and secondary alcohols. The primary alcohol used in these tests was 2-ethylhexanol, the secondary alcohol was 4-methyl-2-pentanol. The polyhydric alcohols used in later testing are noted below.

In order to moderate the reaction speed to a range convenient for experimental measurements, tests were run using a monohydric alcohol in a solvent and the percentage of isocyanate converted to urthanes was measured. The first of these tests was conducted using the formulation set forth below designated Test Formula A, to which varying amounts of dibutyltin dilurate catalysts and dibutyltin disalicylate catalyst were added in amount equivalent to 0.01, 0.02 and 0.04 gram of tin, respectively. In the following tables and formulations, unless otherwise clearly indicated, "laurate catalyst" shall be understood to mean dibutyltin dilaurate, "salicylate catalyst" shall be understood to mean dibutyltin disalicylate, "nitrobenzoate catalyst" shall be understood to mean dibutyltin di(p-nitrobenzoate), and "chlorobenzoate catalyst" shall be understood to include dibutyltin di(o-chlorobenzoate).

TESTING PROCEDURE

A carefully measured predetermined quantity of catalyst was dissolved in a specific volume of toluene to produce a standardized solution of catalyst, usually containing from 0.01 to 0.05 gram of tin metal in every 25 ml. of solution. A 250 ml. wide-mouth Erlenmeyer flask was charged with 25 ml. of catalyst solution, and 8 grams of toluene diisocyanate in 25 ml. of dry toluene were added to the flask with constant stirring. Twenty grams of the alcohol were then added, all at once, to the flask. The reaction was allowed to proceed for exactly two minutes, or some other specific period of time as set forth in conjunction with specific illustrations hereinafter, and was then quenched by the addition of 25 grams of a 50% solution of di-n-butylamine in dry toluene. After cooling to room temperature a 10 ml. aliquot was withdrawn and titrated with 0.5 N HCl to a bromcresol green endpoint to determine the amount of free amine. Two "blanks" were also run with the test samples as a part of every series of tests. In one of the blanks the toluene diisocyanate was replaced by an equal volume of dry toluene, while in the other the alcohol was replaced by an equal volume of dry toluene. The titration of the first blank is used at the equivalent of full isocyanate reaction prior to quench, and the second blank is used as the equivalent of zero isocyanate consumption prior to quench. The percent unreacted isocyanate values in the other tests were then precisely measured by linear interpolation between these points.

It should be noted that the absolute values observed varied somewhat from test to test, due partly to variation in the ambient laboratory temperature, and probably due also to minor variations in the composition of the starting materials, taken from different supply batches etc. In any one series of tests, however, all of the materials were taken from a single supply batch and the performance data were, as far as could be ascertained, directly comparable. Unless otherwise specifically stated, the data in each table were obtained from a single series of tests run simultaneously and all materials in a single series of tests were taken from a single supply batch.

As used herein TDI shall be understood to mean toluene diisocyanate, and unless otherwise noted, the toluene diisocyanate was the commercial product, containing, typically, 80% 2,4-isomer and 20% 2,6-isomer.

Test Formula A 2-ethylhexanol—20 grams
Toluene—75 ml.
TDI—8 grams
Catalyst—as set forth in Table I

TABLE I

| Catalyst level (in grams of tin metal) | Percent unreacted isocyanate using laurate catalyst | Percent unreacted isocyanate using salicylate catalyst |
| --- | --- | --- |
| 0.01 | 44.0 | 43.2 |
| 0.02 | 36.2 | 32.8 |
| 0.04 | 27.5 | 23.3 |

The silicylate catalyst is seen to have a small but distinct advantage over the laurate in speed of reaction of a typical primary alcohol and this advantage increases with increasing catalyst level. Thus, using unreacted isocyanate as a measure of reaction at 0.01 gram of tin, the salicylate catalyst is 2% better than the laurate; at 0.02 gram it is 10% better; at 0.04 gram it is 15% better.

Test Formula B 2-ethylhexanol—20 grams
Toluene—35 ml.
TDI—8 grams
Catalyst—as set forth in Table II

TABLE II

| Catalyst level (in grams of tin metal) | Percent unreacted isocyanate using laurate catalyst | Percent unreacted isocyanate using salicylate catalyst |
| --- | --- | --- |
| 0.01 | 32.6 | 30.2 |
| 0.02 | 22.6 | 18.0 |
| 0.04 | 10.3 | 4.0 |

It is seen that in Test Formula B, where the inert diluent concentration is decreased and the reaction rates correspondingly increased, the relative superiority of salicylate over the laurate remains. At 0.01 gram of tin the salicylate is 7% better than the laurate; at 0.02 gram of tin it is 20% better; at 0.04 gram it is 61% better.

By comparison with the previous test, it is observed that with the elimination of part of the inert diluent the comparative superiority of salicylate over laurate increases, a direction eminently favorable for salicylate in the commercial systems which contain little or no diluent.

In order to more graphically depict the results of Tables I and II these results have been plotted on a graph shown in FIGURE 1 wherein curve 1 is the reaction curve of Test Formula A using the laurate catalyst; curve 2 is the reaction curve of Test Formula A using the salicylate catalyst; curve 3 is the reaction curve of Test Formula B using the laurate catalyst, and curve 4 is the reaction curve of Test Formula B using the salicylate catalyst, all curves being a semi-logarithmic plot of unreacted isocyanate against catalyst level. The use of a semi-logarithmic plot is of course the accepted manner of detailing reaction curves of this type because it better reflects the increase in reactivity at increased catalyst levels when the amount of previously reacted isocyanate substantially reduces the number of molecules available to react.

It was previously noted that the preferred catalyst of the present invention are dialkyltin salts of aromatic carboxylic acids having a $pK_a$ of from about 2.0 to 4.0. It was also noted that though salicylic acid (o-hydroxybenzoic acid) and p-hydroxybenzoic acid are position isomers, salicylic acid has a $pK_a$ of 2.97 while p-hydroxybenzoic acid has $pK_a$ of 4.48. Dibutyltin disalicylate is a superior catalyst in polyurethanes when compared with known catalysts such as dibutyltin dilaurate, while dibutyltin di-(p-hydroxybenzoate) is inferior to both the salicylate and the laurate in comparative tests. The following quantitative comparison clearly illustrates that the dialkyltin salts of aromatic carboxylic acids having a $pK_a$ of from about 2.0 to 4.0 are superior to the corresponding dialkyltin salts of aromatic carboxylic acids having a $pK_a$ in excess of about 4.0. The data contained in Table III were obtained by carrying out a new series of experiments on Test Formula B, using a catalyst level equivalent to 0.22 gram of tin and measuring the percentage of unreacted isocyanate after exactly 2 minutes of reaction.

TABLE III

| Catalyst: | Percent unreacted isocyanate after 2 minutes of reaction |
| --- | --- |
| Dibutyltin dilaurate | 37.2 |
| Dibutyltin disalicylate | 32.8 |
| Dibutyltin di(p-hydroxybenzoate) | 41.4 |
| Dibutyltin di(p-nitrobenzoate) | 30.0 |

From the foregoing it will be seen that the $pK_a$ of the acid from which the dibutyltin salt was made is a significant distinguishing characteristic of the preferred catalysts. A comparison of the salicylate and p-hydroxybenzoate shows that the nature of the substituted groups on the aromatic ring do not sufficient define the suitable catalysts and a comparison of the p-nitrobenzoate and the p-aminobenzoate and/or the p-hydroxybenzoate shows that the position of the substituent on the ring does not sufficiently define the preferred catalysts.

In view of the results obtained in the testing of Formulae A and B, a new series of tests were conducted on polyhydric alcohols such as diethylene glycol, triethylene glycol and trimethylene glycol.

Test Formula C

Diethylene glycol—20 grams
Toluene—30 ml.
Isopropanol (coupling agent)—5 ml.
TDI—8 grams
Catalyst—level per Table IV The isopropanol, used to increase the compatability of the components, undoubtedly participates in the urethane reaction to some extent, but it did not obscure the relative merits of the catalysts used.

TABLE IV

| Catalyst level (in grams of tin metal) | Percent unreacted isocyanate using laurate catalyst | Percent unreacted isocyanate using salicylate catalyst |
| --- | --- | --- |
| 0.02 | 20.3 | 15.5 |
| 0.04 | 13.2 | 4.0 |
| 0.05 | 8.7 | 1.0 |

Here, the advantage of the salicylate over the laurate is 24% at 0.02 gram of tin, 70% at 0.04 gram of tin and 88% at 0.05 gram of tin.

Test Formula D

Triethylene glycol—20 grams
Toluene—30 ml.
Isopropanol (coupling agent)—5 ml.
TDI—8 grams
Catalyst—level per Table V

TABLE V

| Catalyst level (in grams of tin metal) | Percent unreacted isocyanate using laurate catalyst | Percent unreacted isocyanate using salicylate catalyst |
|---|---|---|
| 0.01 | 22.7 | 21.7 |
| 0.02 | 6.5 | 0 |
| 0.03 | 6.0 | |
| 0.04 | 2.5 | |
| 0.05 | 1.6 | |

The ability of the salicylate catalyst (at 0.02 gram of tin) to drive the reaction to completion in two minutes is particularly impressive since the continued increase in the level of laurate catalyst fails to accomplish this end even at 250% of the salicylate catalyst level.

Test Formula E

Trimethylene glycol—20 grams
Toluene—30 ml.
Isopropanol (coupling agent)—5 ml.
TDI—8 grams
Catalyst—level per Table VI

TABLE VI

| Catalyst level (in grams of tin metal) | Percent unreacted isocyanate using laurate catalyst | Percent unreacted isocyanate using salicylate catalyst |
|---|---|---|
| 0.01 | 9.4 | 5.8 |
| 0.02 | 5.5 | 0 |
| 0.03 | 5.2 | |
| 0.05 | 4.7 | |

These data confirm for trimethylene glycol the observations previously made for triethylene glycol.

Tests similar to those conducted on Test Formulae A through E were repeated using the dibutyltin di(p-nitrobenzoate) as the catalyst and substantially similar results to those obtained with the disalicylate catalyst were obtained when the dinitrobenzoate catalyst was employed.

Since the diethylene glycol, the triethylene glycol, and the trimethylene glycol used in Test Formulae C, D and E were all polyhydric alcohols in which both of the hydroxyls were primary hydroxyls and since the commercially popular polyols often contain secondary hydroxyl radicals, a further series of tests were conducted using 4-methyl-2-pentanol as the secondary alcohol.

Test Formula F 4-methyl-2-pentanol—20 grams
Toluene—50 ml.
TDI—8 grams
Catalyst—level per Table VII

TABLE VII

| Catalyst level (in grams of tin metal) | Percent unreacted isocyanate using laurate catalyst | Percent unreacted isocyanate using salicylate catalyst | Percent unreacted isocyanate using nitrobenzoate catalyst | Percent unreacted isocyanate using an equimolar mixture of salicylate and nitrobenzoate catalyst |
|---|---|---|---|---|
| 0.01 | 56.1 | 56.1 | 54.8 | 55.5 |
| 0.02 | 55.5 | 47.1 | 45.2 | 47.1 |
| 0.03 | 54.8 | 38.8 | 36.7 | 35.5 |

The tests using the equimolar mixture of salicylate and nitrobenzoate catalyst would seem to indicate that neither positive or negative synergism is exhibited by the mixture, but that both salicylate and nitrobenzoate are significantly better than the laurate at tin contents exceeding 0.01 gram in the mixture.

Using Test Formula A, a comparison was made of the salicylate, p-nitrobenzoate and the laurate, but in this test the level of catalyst was maintained constant, equivalent to 0.02 gram of tin, and the reaction time was varied, whereas in previous tests, reaction time was constant and catalyst level was varied.

TABLE VIII

| Time (min.) | Percent unreacted isocyanate using laurate catalyst | Percent unreacted isocyanate using salicylate catalyst | Percent unreacted isocyanate using nitrobenzoate catalyst |
|---|---|---|---|
| 2.0 | 38.0 | 33.7 | 29.9 |
| 3.5 | 13.0 | 6.4 | 5.6 |

It is evident that the nitrobenzoate is somewhat superior to the salicylate in this particular test, but both the salicylate and the nitrobenzoate are considerably superior to the laurate.

A similar series of time variation tests were conducted in order to test the applicability of these catalysts in a system involving secondary hydroxyl groups. These tests were run using Test Formula F, a catalyst level of 0.02 gram of tin metal, and the reaction was measured after 2 minutes and 3 minutes, respectively.

TABLE IX

| Time (min.) | Percent unreacted isocyanate using laurate catalyst | Percent unreacted isocyanate using salicylate catalyst | Percent unreacted isocyanate using nitrobenzoate catalyst |
|---|---|---|---|
| 2.0 | 43.8 | 36.2 | 30.0 |
| 3.0 | 30.8 | 24.5 | 17.2 |

Another series of tests were conducted using Test Formula F to determine the extent of reaction as a function of tin for compositions containing, respectively, the salicylate catalyst, p-nitrobenzoate catalyst, dibutyltin di-p-chlorobenzoate, dibutyltin di-o-chlorobenzoate, and dibutyltin dilaurate. The reaction was stopped after 2 minutes and after 3 minutes, respectively. The results of these experiments are shown in Table X.

TABLE X

| Catalyst | Percent unreacted isocyanate after 2 minutes | Percent unreacted isocyanate after 3 minutes |
|---|---|---|
| p-Chlorobenzoate | 49.4 | 44.2 |
| o-Chlorobenzoate | 49.4 | 42.8 |
| Salicylate | 45.2 | 41.6 |
| p-Nitrobenzoate | 45.4 | 38.4 |
| Laurate | 54.8 | 48.5 |

A further series of tests were also run using polyols, the accepted art designation for polyhydric alchohols. The polyols employed in these tests were polyhydric alcohols in which at least one of the hydroxyls was a secondary hydroxyl radical. The polyols employed in this test were triethylene glycol and dipropylene glycol, though qualitatively similar results were observed with 1,2 propylene glycol. In these tests the salicylate and p-nitrobenzoate were compared with the laurate using Test Formulae G and H. The extent of the reaction was measured after 2 minutes and 3 minutes.

Test Formula G

Triethylene glycol—20 grams
Toluene—30 ml.
Isopropanol (coupling agent)—5 ml.
TDI—8 grams
Catalyst (per Table XI)—equivalent to 0.02 grams of contained tin Test Fromula H Dipropylene glycol—20 grams
Toluene—30 ml.
Isopropanol (coupling agent)—5 ml.
TDI—8 grams
Catalyst—equivalent to 0.02 grams of contained tin

TABLE XI

| Catalyst | Test Formula G— percent unreacted isocyanate after— | | Test Formula H— percent unreacted isocyanate after— | |
|---|---|---|---|---|
| | 2 min. of reaction | 3 min. of reaction | 2 min. of reaction | 3 min. of reaction |
| Nitrobenzoate | 32.6 | 13.8 | 46.4 | 40.5 |
| Salicylate | 29.8 | 13.4 | 46.6 | 35.0 |
| Laurate | 37.0 | 26.0 | 49.5 | 41.2 |

In the case of some higher polyols, e.g. triethylene glycol, the reaction was accompanied by the separation of a liquid polyurethane phase, which was immiscible with the solvent. It was observed that the volume of the polyurethane phase was greater, per unit of elapsed time, when salicylate and nitrobonzoate catalyst were used than when the laurate was used.

The degree of polymerization in experiments using Test Formula G, is of course a direct measure of catalyst efficiently, and it can be evaluated by measurement of the viscosity of the immiscible polyurethane liquid phase after 3 minutes of reaction. Using the laurate catalyst the polymer phase was quite fluid (Gardner viscosity "A"); using the nitrobenzoate catalyst, it was much more viscous (Gardner viscosity "E"); and using the salicylate catalyst, it was quite viscous (Gradner viscosity "H"). Since it is generally accepted that the viscosity of liquid phase containing polymers, increases with the molecular weight of those polymers, the preceding comparison of viscosities can be regarded as confirming the increased degree of reaction obtained with the salicylate and nitrobenzoate catalysts.

It will of course be understood that polyether alcohols and polyester alcohols are often employed in commercial production of polyurethane compositions. Tests using commercial coating techniques with commercial formulations including polyesters and polyethers, confirm that these operations can be increased in speed by as much as 25%, using the salicylate catalyst over results obtained with dibutyltin dilaurate catalyst. Thus it is evident that the advantages of the catalysts of the present invention are not artifacts of experimental procedure, but commercially realizable advantages in speed of processing etc.

The commercial choice of polyether and polyester alcohols is based not only on the speed or degree of relativity exhibited in the formation of the urethanes, but in great measure, to the properties of the polyurethanes formed. In other words, comparably improved results can be obtained when the novel catalyst of the present invention are used with polyethers and/or polyesters. While specific polyethers and/or polyesters may react faster, or slower than some of the alcohols used in specific tests discussed hereinbefore, the effect on reaction speed is not the sole reason for the choice of a particular alcohol in comercial formulation since it is well known that other considerations also effect the choice of alcohols. These considerations are well known to the art and specifically disclosed in the literature.

Among the specific considerations which affect the choice of alcohols in preparing polyurethanes mention may be made of the following which are listed by L. N. Phillips et al. on p. 91 of Polyurethanes; Chemistry, Technologys and Properties; (published for The Plastics Institute by Iliffe Books Ltd. London, 1964).

(1) Regularity of molecular structure increases the likelihood of crystallisation. This may or may not be desirable depending on whether a fibrous, or rigid, or elastomeric material is contemplated.

(2) Long chains of methylene groups confer mobility to the molecule, and rubberiness and low hardening temperature to the polyurethane.

(3) Bulky aromatic nuclei reduce the mobility of the molecule. They may also confer enhanced tear-resistance.

(4) Ester groups separated by long polymethylene chains are generally more heat resistant than if they are close together. Aromatic acids may also confer heat resistance.

(5) Short chains of any sort between functional groups increase the proportion of atoms in the molecule which are involved in polar groups and hence the amount of possible hydrogen bonding. This may increase the strength and rigidity of the materials.

(6) Increasing the proportion of polar groups, esters, urethanes, etc. increase the degree to which the material is subject to hydrolysis damage.

(7) The greater the proportion of trifunctional material in the polyester the greater the number of branches or pendant reactive groups, and hence the more cross-linking in the final material.

(8) The relative cost and availability of materials must always be borne in mind.

In view of the foregoing it will be understood that the term polyhydric alcohol, as used herein and in the appended claims, shall include not only polyhydric alcohols per se but also polyether alcohols and polyester alcohols.

The polyurethane compositions of the present invention are composed substantially of at least one polyhydric alcohol, at least one isocyanate compound and a catalytic amount of a catalyst of the type disclosed herein. While in general stoichiometric equivalents of alcohol and isocyanate are employed a substantial excess of one or the other is quite common and such an excess does not affect the advantages to be gained by using the novel catalysts of the present invention. It will also be understood that certain diluents, pigments, fillers and other additives may be combined with the novel compositions of the present invention without substantially altering the advantages set forth hereinbefore.

It will of course be obvious that many other changes, modifications, and alterations can be made in the compositions and methods herein described without departing from the scope of the invention herein disclosed, and it is our intention to be limited only by the appended claims.

As our invention we claim:

1. A process for producing a urethane comprising reacting an organic isocyanate and an organic alcohol in the presence of a catalytic amount of a tin salt having the formula:

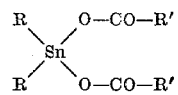

wherein R is an alkyl radical having 2 to 8 carbon atoms and R' is a member selected from the group consisting of nitrophenyl radicals, and 2-hydroxyphenyl radicals.

2. The process of claim 1 wherein R is a butyl radical.

3. The process of claim 1 wherein said isocyanate is an organic polyisocyanate and said alcohol is an organic polyol.

4. The process of claim 1 wherein the tin salt is dibutyltin disalicylate.

5. The process of claim 1 wherein the tin salt is dibutyltin nitrobenzoate.

References Cited

UNITED STATES PATENTS

| | | | |
|---|---|---|---|
| 3,148,162 | 9/1964 | Gmitter et al. | 260—2.5 |
| 3,194,773 | 7/1965 | Hostettler | 260—2.5 |
| 3,240,730 | 3/1966 | Hostettler et al. | 260—2.5 |
| 3,306,926 | 2/1967 | Neher et al. | 260—471 |
| 3,427,263 | 2/1969 | Overmars | 260—2.5 |

OTHER REFERENCES

Entelis et al., Journal of Cellular Plastics, August 1967 edition, pp. 360–363 cited as being of interest.

DONALD E. CZAJA, Primary Examiner

M. J. WELSH, Assistant Examiner

U.S. Cl. X.R.

117—155; 260—18, 429.7